June 20, 1944. D. B. REPLOGLE Re. 22,501

DETECTING INDICATOR FOR AIR-METHOD CLEANING SYSTEMS

Original Filed Sept. 22, 1941

Inventor

D. B. REPLOGLE,

By Munson H. Lane

Attorney

Reissued June 20, 1944

Re. 22,501

UNITED STATES PATENT OFFICE 22,501

DETECTING INDICATOR FOR AIR-METHOD CLEANING SYSTEMS

Daniel Benson Replogle, deceased, late of Berkeley, Calif., by Bank of America National Trust & Savings Association, San Francisco, Carl S. Replogle, Piedmont, and Harold E. Queen and Laurie H. Bullock, both of Berkeley, Calif., executors; said Daniel Benson Replogle assignor to the Ohio Citizens Trust Company, Toledo, Ohio, a corporation of Ohio, as trustee Original No. 2,293,920, dated August 25, 1942, Serial No. 411,931, September 22, 1941. Application for reissue January 11, 1944, Serial No. 517,897

9 Claims. (Cl. 302—65)

This invention relates to the subject of air-method cleaning systems in which an air stream is used for its erosive action in removing dust, litter and the like from carpets, rugs, floors or articles of clothing, including shoes, etc.

An important object of the invention is to make visible to the operator the results being obtained by the sweeping operation and to indicate to him whether or not dust is being drawn into the cleaner and if so to show the character of the dust. The improvement is also intended to retrieve articles of value such as jewelry or buttons from places being cleaned where such articles may have been accidentally drawn into the air stream.

A further object of the invention is to render such indicating devices more effective by being made of transparent, plastic material so as to keep them light and convenient for use in the hand or about the work of suction or air-method cleaners whether of the stationary, semi-stationary or portable types. Heretofore such indicators have been too heavy and have depended upon reversing the air stream so as to clear the indicator from accumulated dust and litter.

It is well known that transparency alone does not make dust visible in passing through a transparent pipe, but an eddy current or slowing of the flow must be effected in some way in order to make the content of dust and litter visible during the cleaning operation. Any enlargement or chamber in the air passage will have the tendency to either slow the stream or cause eddies therein or both. The present arrangement is designed to cause a rapid eddy of part of the stream and a slowing of that part of the stream in passing through a screen forming part of the device.

One of the objects of the present invention is accordingly to effect a superior showing of the dust by making the whole of the device as nearly as possible of transparent material and to cause a clearing of the indicator without reversing the whirl of the incoming dust and with as little interference as possible with the efficiency of the stream, and also to prevent the vane from being accidentally placed in such position as to interfere with operation of the air stream.

These and other objects are attained by the construction, arrangement and operation of the parts as herein described and illustrated in the accompanying drawing in which.

Figure 1:
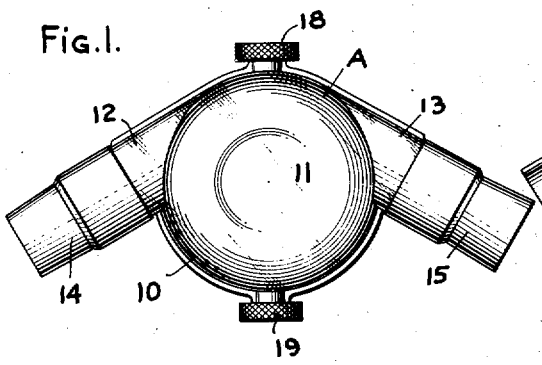
Fig. 1 is a side elevation of the article complete and ready to be incorporated into the suction pipe line of a cleaning system.
Figure 2:
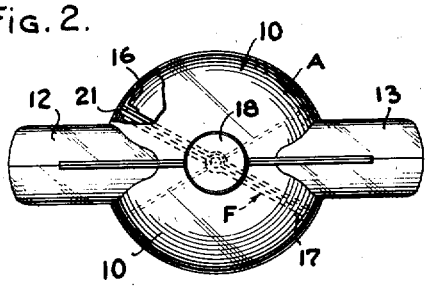
Fig. 2 is a top view taken on Fig. 1 with the assembling pipe connections removed from the transparent element of the device.
Figure 3:
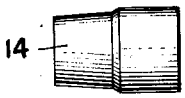
Figure 3A:
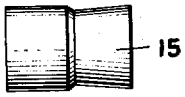

Figs. 3 and 3*a* show respectively a male and female nipple for pipe connection, one end of each being adapted to slide over and secure as an assembling ring the parts of the body shown in Figs. 1 and 2.

Figure 4:
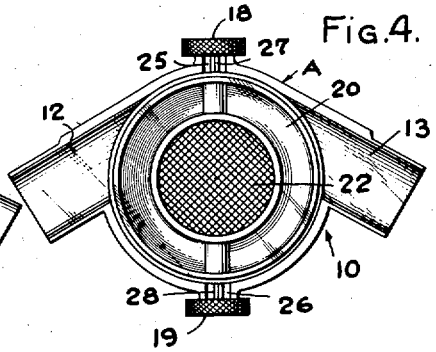

Fig. 4 is a view of the one-half of the article shown in Fig. 2 and is designed to show the location of the median vane or diaphragm which is adapted to turn about its vertical axis between the two halves of the assembled shell or outside globular part of the device.

Figure 5A:
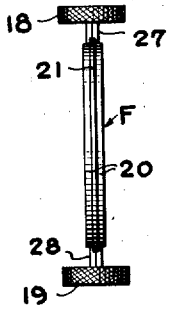
Figure 5B:
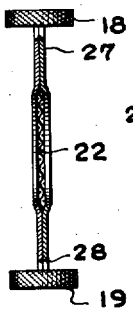
Figure 5C:
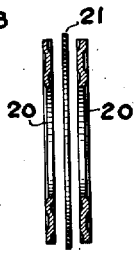

Figs. 5*a*, 5*b* and 5*c* are respectively an edge view of the diaphragm shown in Fig. 4; a cross sectional view of the shaft and screen; and cross sections of the laminations making up this ring or vane, one of the said laminations being a rubber, felt or leather ring having its edges to coincide with the inner globular surface of the chamber and being clamped between transparent assembling rings which also are designed to hold in place the central screen of the diaphragm or vane a side view of which is shown in Fig. 4 in what may be called a neutral position when the device is in operation.

Figure 6:
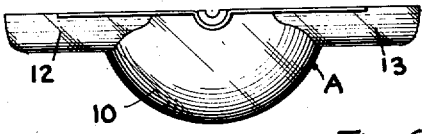

Fig. 6 represents one of two exactly alike shells or halves of the globular construction shown in the other figures, Figs. 1, 2 and 4.

Figure 8:
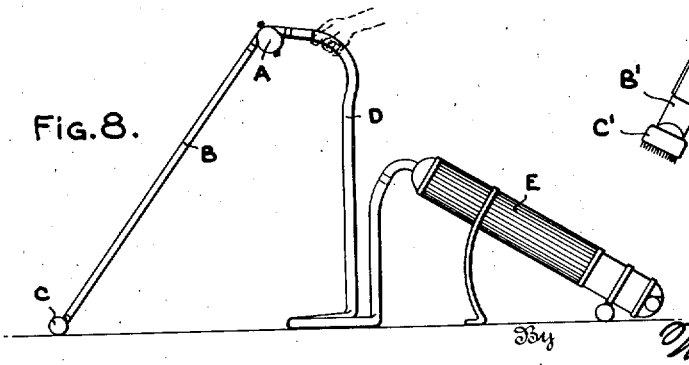
Figure 7:
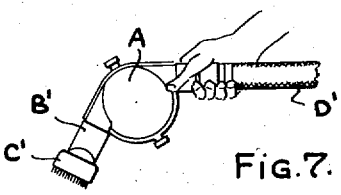

Fig. 7 is suggestive of a method of using the device where a special nozzle suitable for cleaning clothing and the like is applied to the nipple instead of a suction extension pipe as shown in Fig. 8.

Fig. 8 suggests the total assembly of a portable sweeper with pipe attachment where the suction extension pipe may be used attached to and parallel to the body of the machine or in a position dissociated from the machine except for its connection through the hose pipe.

Referring to Fig. 8, A designates a transparent indicator embodying my invention. B denotes a hollow wand constituting the suction pipe of a cleaning apparatus, to the lower end of which is attached a suitable floor tool or other suction nozzle C. The outlet from the indicator is connected through flexible tubing or the like D with suitable suction producing and filtering means E.

A similar arrangement is indicated in Fig. 7 wherein the indicator A is connected through a short pipe B′ to a suitable cleaning tool C′ while the outlet to the indicator is connected through a flexible tubing D′ to a suitable source of suction not shown. The tool shown in Fig. 7 is adapted to be held in the hand of the operator.

The indicator A may be composed of any light transparent material as for example Celluloid or one of the newer transparent plastics such as vinyl resin or the like. The indicator is preferably composed of two identical shells or halves 10—10 one of which is indicated in Fig. 6. The shells 10 are of semi-spherical construction and are adapted to be joined in a central vertical plane as illustrated in Fig. 2. When assembled the main portion of the indicator is spherical or globular in form and includes a main chamber 11 having inlet and outlet portions 12 and 13 respectively, also divided in half as indicated in Fig. 2. When the parts are assembled the two nipples 14 and 15 shown in Figs. 3 and 3*a* respectively are attached to the inlet and outlet portions 12 and 13 respectively and thus serve to hold the indicator in assembled position. The nipples 14 and 15 are preferably of light transparent material similar to the indicator itself. When assembled these nipples hold the two halves of the indicator snugly together and insure a fluid tight fit. The nipples 14 and 15 are adapted to be connected at their other ends to pipes B and D respectively of Fig. 8 or B′ and D′ of Fig. 7.

Within the globular chamber 11 is mounted a disc shaped laminated diaphragm or vane generally designated by the reference character F. Stops 16 and 17 within the globular chamber 11 limit the movement of the diaphragm, and prevent the vane from being placed in such position as to interfere with the operation of the air stream. The diaphragm exactly fits within the spherical walls of the chamber A and is adapted to be rotated about the central vertical axis by means of knobs or handles 18 and 19 as best indicated in Fig. 4. These knobs are located, one above and the other below the axis of the diaphragm and may be formed of rubber, preferably soft rubber with knurled edges, the rubber lightly impinging on the shell at opposite openings therein. These knobs act as seals to prevent any leakage of air through the openings 25 and 26 in the wall of the indicator. The knobs are connected to the diaphragm through suitable stems 27 and 28.

As shown the diaphragm F is made up of a pair of transparent rings 20, gripping between them a ring 21 of somewhat greater diameter than the rings 20—20. The ring 21 serves as a seal and is adapted to engage the wall of the globular chamber. This ring may be made of rubber, felt, leather or other suitable material adapted to provide a fluid tight seal. The transparent rings 20 are also adapted to grip between them a central screen 22. The various laminations of which the diaphragm is composed may be secured together by the use of suitable adhesive or by fusing together the various laminations or by the use of other suitable fastening means.

In operation the diaphragm F may be located in either of the two dotted positions indicated in Fig. 2 or the diaphragm may be moved to a neutral position such as is indicated in Fig. 4 wherein the diaphragm is in the vertical plane which joins the two halves of the indicator.

When the diaphragm is located in one of the diagonal positions shown in Fig. 2, dust laden air entering from suction pipe B or B′ will first be deflected outward toward the spherical wall of the indicator by reason of the rings 20 so that the amount of dust carried by the air will be readily apparent to the operator. Ultimately the air and the finer particles of dust will pass through the central screen 22 and out through pipe D or D′ to a suitable filtering means. Any larger particles, including articles of value such as jewelry, coins, buttons or the like will be screened out before entering the outlet pipe. Such articles can be readily removed from the spherical chamber by simply uncoupling the device from the pipe line and emptying through the nipple.

It will be noted that nearly all the parts of the device are in pairs, that is to say, there are two hemispherical shells or parts which when put together face to face constitute the whirling chamber. There are also two knobs for turning the diaphragm which knobs may be exactly alike, one located above and the other below the diaphragm; also the discs 20—20 may be identical. This arrangement lends simplicity to the device and decreases manufacturing costs.

The invention has been described in detail for the purpose of illustration but it will be obvious that many modifications and variations may be resorted to without departing from the spirit of the invention.

What is claimed is:

1. A dust indicator for a suction cleaning system, comprising a spherical chamber located in the system, having transparent outer wall and a circular diaphragm mounted for rotation about an axis within the chamber, said diaphragm including an outer transparent ring portion adapted to deflect dust against the spherical wall of the chamber and having a central opening to permit air and dust to pass to an outlet passage.

2. A dust indicator as set forth in claim 1 wherein the spherical chamber wall is centrally divided and is provided with inlet and outlet portions, and sleeves fitting said inlet and outlet portions and serving to hold the indicator in assembled position.

3. A dust indicator as set forth in claim 1 wherein limiting stops for the diaphragm are provided within the chamber wall.

4. A dust indicator as set forth in claim 1 wherein a screen is provided for said ring opening.

5. A dust indicator as set forth in claim 1 wherein the diaphragm is mounted on an axis passing through the wall of said chamber and knobs are provided at the ends of said axis serving the dual purpose of sealing the openings in said cylindrical wall aand providing means for rotating the diaphragm about its axis.

6. A dust indicator as set forth in claim 1 wherein the diaphragm is provided with a sealing ring engaging the wall of the chamber.

7. A dust indicator as set forth in claim 1 wherein the diaphragm includes a pair of transparent outer rings with a screen between them extending across said opening.

8. A dust indicator for suction cleaning systems, adapted to be interposed between adjacent tubular elements of the system, located between the suction nozzle and a source of suction; said indicator comprising a globular indicator element having inclined inlet and outlet pipes, and being formed in two halves each of which includes one-half of the inlet and outlet pipes, and an annular deflector element positioned within the globular element and adapted to extend diagonally between the inlet and outlet openings.

9. An indicator as set forth in claim 8 wherein the deflector element is shiftable to permit accumulated dust to be removed from one side by the incoming air.

BANK OF AMERICA NATIONAL TRUST & SAVINGS ASSOCIATION,
By T. F. REYNOLDS,
*Assistant Trust Officer.*
CARL S. REPLOGLE,
HAROLD E. QUEEN,
LAURIE H. BULLOCK,
*Executors of the Estate of Daniel Benson Replogle, Deceased.*